United States Patent
Eyster et al.

(10) Patent No.: US 10,769,523 B2
(45) Date of Patent: Sep. 8, 2020

(54) USING ANALYTICS TO DETERMINE DINING VENUE BASED ON GROUP PREFERENCES

(71) Applicant: International Business Machines Corporation, Armonk, NY (US)

(72) Inventors: Justin D. Eyster, Selinsgrove, PA (US); Avery K. Rowe, Los Angeles, CA (US); Priyanka Sarkar, Austin, TX (US); Christopher E. Whitridge, Gaithersburg, PA (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 15/480,255

(22) Filed: Apr. 5, 2017

(65) Prior Publication Data

US 2018/0293489 A1 Oct. 11, 2018

(51) Int. Cl.
G06N 3/08 (2006.01)
G06Q 30/06 (2012.01)
G06N 3/04 (2006.01)

(52) U.S. Cl.
CPC ............ *G06N 3/08* (2013.01); *G06N 3/0445* (2013.01); *G06N 3/0454* (2013.01); *G06Q 30/0631* (2013.01)

(58) Field of Classification Search
CPC .... G06Q 30/0631; G06N 3/08; G06N 3/0454; G06N 3/0445
See application file for complete search history.

(56) References Cited

U.S. PATENT DOCUMENTS

| | | | | |
|---|---|---|---|---|
| 8,732,101 | B1* | 5/2014 | Wilson | G06N 3/063 706/15 |
| 9,633,456 | B2* | 4/2017 | Wolfe | G06T 11/206 |
| 2009/0254541 | A1* | 10/2009 | Kolawa | G06Q 10/063 |
| 2013/0149678 | A1* | 6/2013 | Tokuda | A47J 36/321 434/127 |
| 2014/0164305 | A1* | 6/2014 | Lynch | G06Q 30/0201 706/46 |

(Continued)

FOREIGN PATENT DOCUMENTS

| | | | |
|---|---|---|---|
| CN | 103412936 | A * | 11/2013 |
| CN | 103793837 | A * | 5/2014 |

(Continued)

OTHER PUBLICATIONS

Hokuto Kayaga et al., "Food Detection and Recognition Using Convolutional Neural Network", ACM, (2014). (Year: 2014).*

(Continued)

*Primary Examiner* — Alexey Shmatov
*Assistant Examiner* — Beatriz Ramirez Bravo
(74) *Attorney, Agent, or Firm* — Diana R. Gerhardt; Jack V. Musgrove

(57) ABSTRACT

A system facilitates the selection of a restaurant which is suitable for a group having disparate taste preferences. Individual flavor profiles contain information pertaining to flavor preferences of individuals, and a group flavor profile is created based on the flavor profiles of individuals in a particular group. The group flavor profile is matched to one or more restaurant flavor profiles. An individual flavor profile includes numerical values associated with different flavor types, such as savory, sweet, sour, bitter and salty. An individual flavor profile is created by receiving an input indicative of a flavor type (such as a dish or food image) and determining the flavor type using a deep-learning neural network. The group flavor profile is created by averaging numerical values for respective flavor types from the individual flavor profiles of the group. A flavor profile can also include non-food preferences such as cost, traffic, distance, and weather.

14 Claims, 6 Drawing Sheets

(56) References Cited

U.S. PATENT DOCUMENTS

| | | | |
|---|---|---|---|
| 2016/0012513 A1* | 1/2016 | Martinez | G06Q 30/0631 |
| | | | 705/15 |
| 2016/0092695 A1* | 3/2016 | Novotny | G06F 16/955 |
| | | | 726/28 |
| 2016/0140789 A1 | 5/2016 | Wickersham, III et al. | |
| 2016/0148299 A1 | 5/2016 | Caralis et al. | |
| 2017/0132589 A1* | 5/2017 | Li | G06F 21/6218 |
| 2018/0025386 A1* | 1/2018 | Lee | G06Q 30/0269 |
| | | | 705/14.66 |

FOREIGN PATENT DOCUMENTS

| | | |
|---|---|---|
| CN | 105184615 A | 12/2015 |
| WO | 03054760 A2 | 7/2003 |
| WO | WO-2014070293 A1 * | 5/2014 |

OTHER PUBLICATIONS

Hikory Matsunaga et al., "Tastes and Textures Estimation of Foods Based on the Analysis of Its Ingredients List and Image", Springer International Publishing, (2015). (Year: 2015).*

Patrick D. Howell et al., "Analyzing Taste Preference from Crowdsourced Food Entries", ACM, (2016). (Year: 2016).*

O'Connor, Mark, et al, "PolyLens: A Recommender System for Groups of Users" Proc. of the European Conf. on Computer Supported Cooperative Work, pp. 199-218 (2001).

Park, Moon-Hee, et al., "Restaurant Recommendation for Group of People in Mobile Environments Using Probabilistic Multi-criteria Decision Making", Proc. of the 8th Asia-Pacific Conf. on Computer-Human Interaction, pp. 114-122 (2008).

* cited by examiner

Hungarian          Jake's Barbecue

Individual *i*

"pasta"

| convolution neural network

↓

Personal Profile $P_i$ appetizers          drinks

Venue Menu *j* entrees          desserts

| convolution neural network

↓

Venue Profile $R_j$

USING ANALYTICS TO DETERMINE DINING VENUE BASED ON GROUP PREFERENCES

BACKGROUND OF THE INVENTION

Field of the Invention

The present invention generally relates to social interaction, and more particularly to a method of selecting a venue for a group of individuals.

Description of the Related Art

It can be difficult to find a restaurant or café where a person can find suitable fare according to taste preferences and dietary restrictions. This difficulty is greatly increased for a group of people who want to eat together while all enjoying their meals. A number of approaches to this problem have been suggested.

U.S. Patent Application Publication no. 2009/0254541 discloses a generalized method of automatically selecting/recommending items based on user preference topography. In particular a restaurant can be recommended using vector distances to the dishes of a specific restaurant. The system analyzes recipe vectors of menu items chosen by members of the group, and selects a restaurant that best satisfies the menu items selected.

U.S. Patent Application Publication no. 2014/0164305 illustrates a system for virtual agent recommendations for multiple persons. In one implementation, the virtual agent may be asked to make a recommendation for the group for a restaurant, and multiple users in the group may inform the virtual agent of their preferences. In this manner, none of the users is required to serve as an exclusive conduit between the group and the virtual agent.

U.S. Patent Application Publication no. 2015/0243186 describes a system that facilitates menu planning. The system tracks and scores nutritional values of different meals.

U.S. Patent Application Publication no. 2015/0371553 relates to a system for personalized nutrition. The system takes information from a user and creates a diet. It then offers suggestions of what items the dieter could have at a particular restaurant. The system may be queried if the user indicates that she does not like the initial suggestions of restaurant menu items.

U.S. Patent Application Publication no. 2016/0012513 teaches a food recommendation engine. A software application receives input from one or more users and provides specific, personalized recommendations related to restaurants and menu items at those restaurants. The application may additionally provide coupons related to the recommendation or in competition with the recommendation to further influence the user's decision.

U.S. Patent Application Publication no. 2016/0035248 shows a system that provides food-portion recommendations to facilitate dieting. A request for dietary and nutritional information of a food item is received and an image is obtained that depicts the food item. A visual display of the portion of the food the dieter should be allowed to eat can be presented.

U.S. Patent Application Publication no. 2016/0140789 is directed to a group-decision engine. The engine uses distributed computing applications by which members of a group reach a decision in the face of a relatively large number of options. Options are presented in multiple rounds at corresponding hierarchical levels of a taxonomy.

U.S. Patent Application Publication no. 2016/0148299 discloses a method for generating location-aware group recommendations. After receiving a group request, user profile data associated with members of the group is accessed, and a group recommendation is generated based on current location data and a combination of a portion of the user profile data from the users.

Patent Cooperation Treaty Application no. WO 2003/054760 illustrates the evaluation of a plurality of alternatives based on individual preferences. Individual preferences regarding a number of attributes are obtained and responses assessed, weighted according to relative importance of the attribute to provide a list of alternatives. One application is for the recommendation of restaurants to a group.

Chinese Patent Application no. 105184615 relates to a restaurant recommendation method suitable for more than one person to have a meal together. The method utilizes position information and surrounding road information of friends who plan to have a meal together and analyzes road, restaurant, traffic and other situations to decide an area for the meal. The method then recommends restaurants in the area for the meal according to customized demands of the users.

The paper entitled "Restaurant Recommendation For Group Of People In Mobile Environments Using Probabilistic Multi-Criteria Decision Making" by Moon-Hee Park et al., in Proceedings of the 8th Asia-Pacific Conference on Computer-Human Interaction, pp. 114-122 (2008), describes a recommendation system that considers the preferences of group users in a mobile environment, applied to recommendation of restaurants. Restaurant recommendation mostly considers the preference of group users, using an analytic hierarchy process of multi-criteria decision making to arrive at the preference of group users from individual users' preferences.

The publication "PolyLens: A Recommender System for Groups of Users" by Mark O'Connor et al., Proceedings of the European Conference on Computer Supported Cooperative Work, pp. 199-218 (2001), addresses restaurant recommendation using social value functions. A recommendation list is created for a user, and then the lists of different users are merged to give recommendations for groups.

SUMMARY OF THE INVENTION

The present invention in at least one embodiment is generally directed to a system for choosing a dining venue for a group of people by receiving a plurality of individual flavor profiles wherein each individual flavor profile contains information pertaining to flavor preferences of a respective individual, receiving a plurality of venue flavor profiles wherein each venue flavor profile contains information pertaining to available items at respective dining venues, receiving a request to choose a dining venue for a group consisting of a plurality of the individuals, creating a group flavor profile based on a subset of the individual flavor profiles corresponding to the plurality of individuals, and selecting a dining venue based on the group flavor profiles and the venue flavor profiles. Each individual flavor profile and each venue flavor profile can include respective numerical values associated with different flavor types. The individual flavor profiles can be created by receiving an input for an individual indicative of a flavor type and determining the flavor type using a deep-learning neural network. Group flavor profile creation can include averaging numerical values for respective flavor types from each of the individual flavor profiles of the subset. The individual flavor profiles can also include non-food preferences such as cost, traffic, distance and weather, and the method can accordingly include receiving current local data pertaining to the non-food preferences. Once a dining venue is selected, the system can make an electronic reservation for the group.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

A typical problem faced by groups is determining a place to eat where all members of the group will be satisfied. Much of the prior art is directed to individual solutions only, i.e., finding a restaurant that comports with a single person's taste preferences and/or dietary restrictions. Other solutions geared to groups take simplistic approaches such as focusing on geographic areas or merging taste preferences. These approaches often result in inferior results where some of the individuals may be satisfied but others are sorely disappointed with menu options or are even totally unable to eat due to food allergies, religious constraints, etc. It would, therefore, be desirable to devise an improved method of restaurant selection which could offer recommendations for dining venues suitable for a group of diverse individuals. It would be further advantageous if the method could help dining establishments adapt to meet their customers' preferences.

The present invention in various embodiments achieves these and other objectives by taking into account the food preferences of everyone in a group and finding one or more commonalities in them. This approach can learn the preferences of individuals and groups using deep learning techniques such as a neural network. According to one implementation, food preferences are constructed using flavor profiles, a quantitative measure of how much a person or group prefers a particular set of flavors. The individual flavor profiles can be combined to create a group flavor profile. Restaurants are then suggested based on restaurant flavor profiles that most closely match the group flavor profiles.

Figure 1:
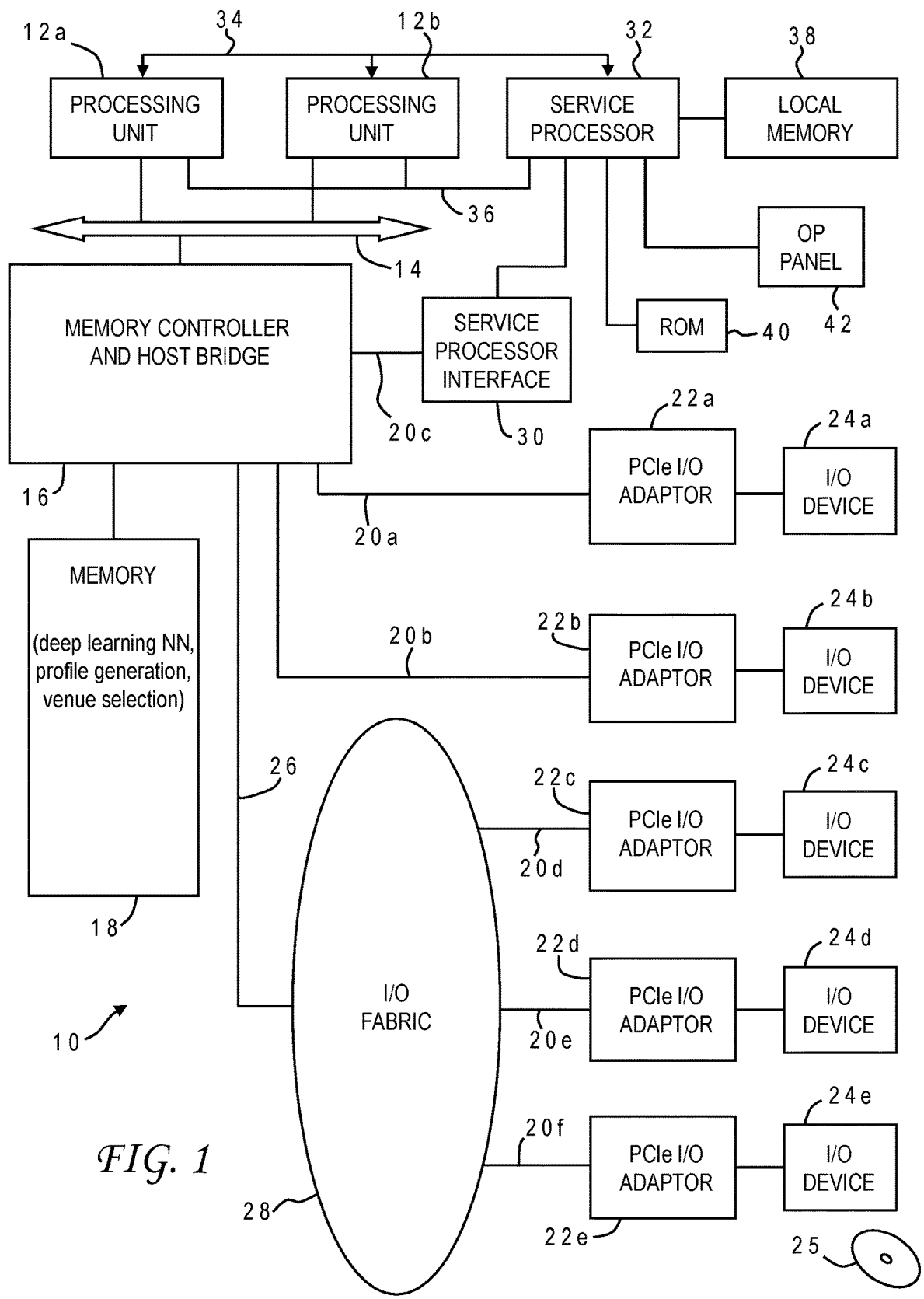
FIG. 1 is a block diagram of a computer system programmed to carry out group restaurant recommendations in accordance with one implementation of the present invention.

With reference now to the figures, and in particular with reference to FIG. 1, there is depicted one embodiment 10 of a computer system in which the present invention may be implemented to carry out the determination of a place where all members of a group will enjoy eating by learning the preferences of individual members and the group. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more applications in accordance with the present invention such as a deep learning neural network, a profile generation program, and a venue selection program.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the restaurant selection application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may also be carried out in part or in whole on a mobile computing device such as a cellphone. Structural details of such devices are known and may for example correspond with the description provided in U.S. Pat. No. 8,615,504, which is hereby incorporated.

Computer system 10 can carry out program instructions for various processes that uses novel techniques to select a restaurant for a group of individuals. Accordingly, a program embodying the invention may additionally include conventional aspects of various computing tools such as a neural network, and these details will become apparent to those skilled in the art upon reference to this disclosure.

Figures 2, 3:
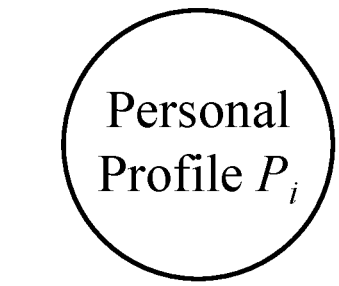
FIG. 2 is a pictorial representation of the generation of an individual's personal flavor profile in accordance with one implementation of the present invention.
FIG. 3 is a pictorial representation of the generation of a restaurant's flavor profile in accordance with one implementation of the present invention.
Figure 4:
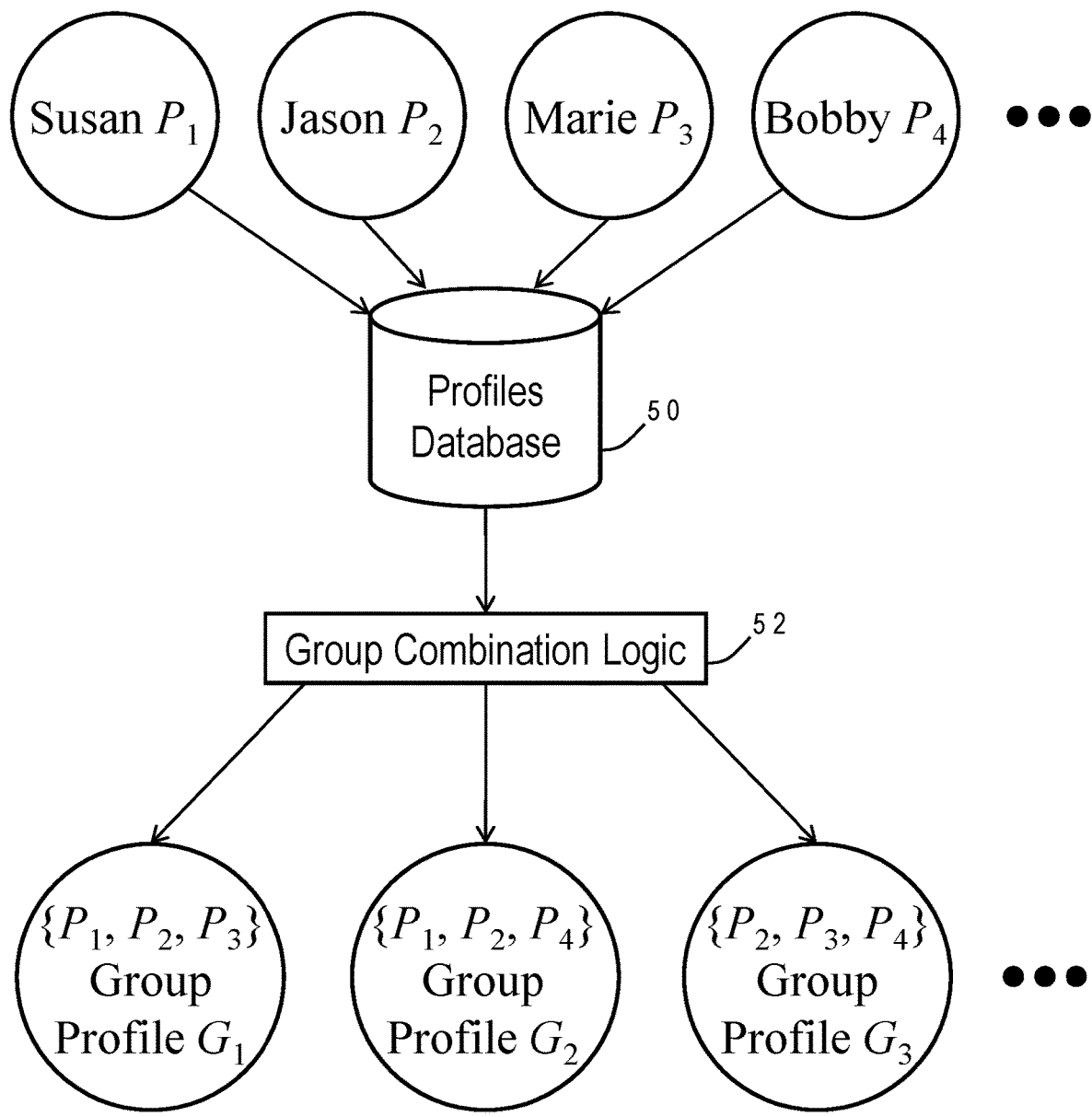
FIG. 4 is a pictorial representation of the generation of a group flavor profile using group flavor combination logic based on selected personal profiles of certain individuals forming the group in accordance with one implementation of the present invention.
Figure 5:
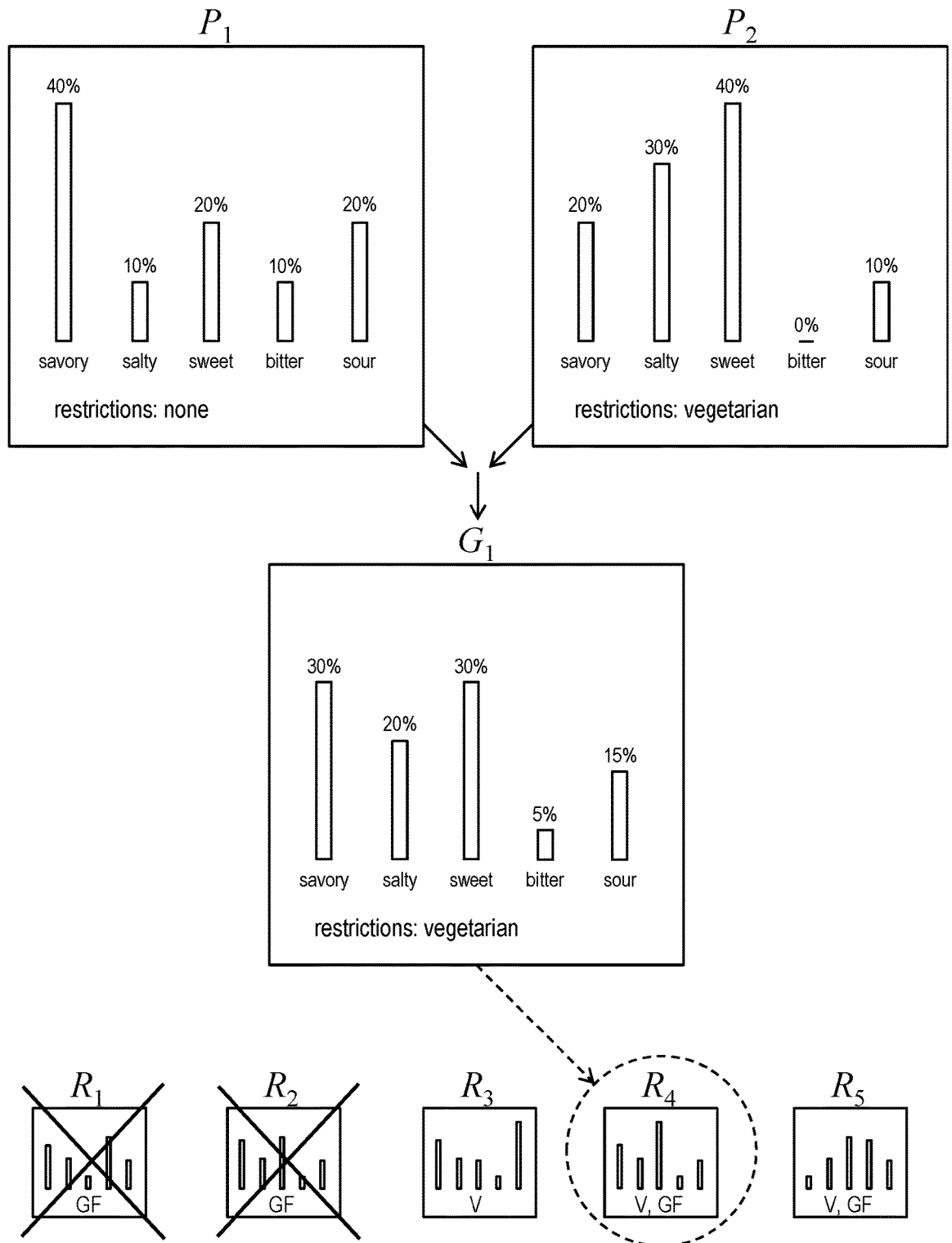
FIG. 5 is a pictorial representation of a specific example of a group profile generated based on two personal profiles and matched to a restaurant profile in accordance with one implementation of the present invention.
Figure 6:
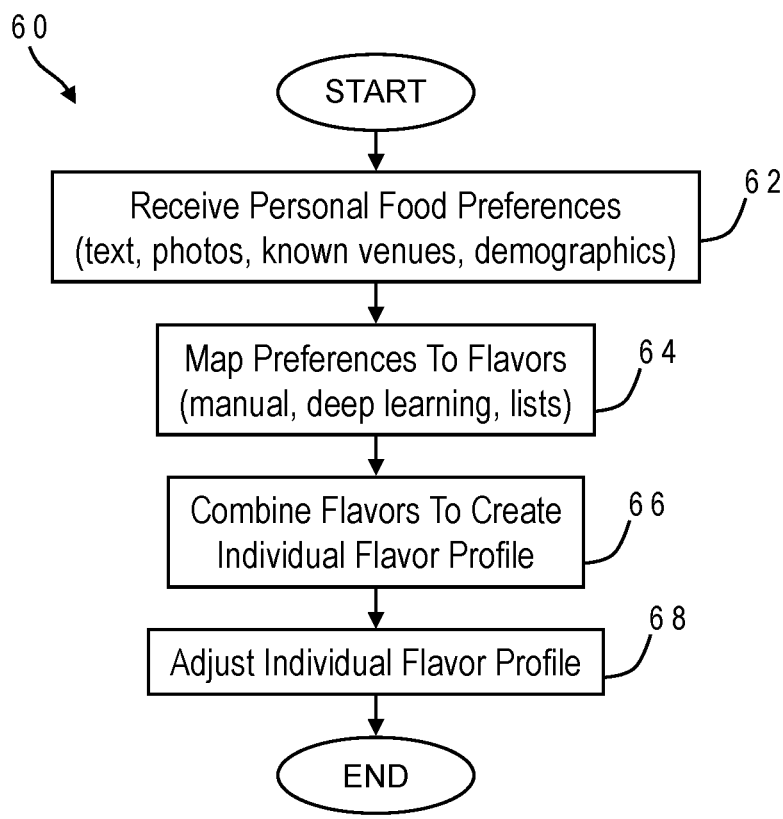
FIG. 6 is a chart illustrating the logical flow for a personal profile generation process in accordance with one implementation of the present invention.
Figure 7:
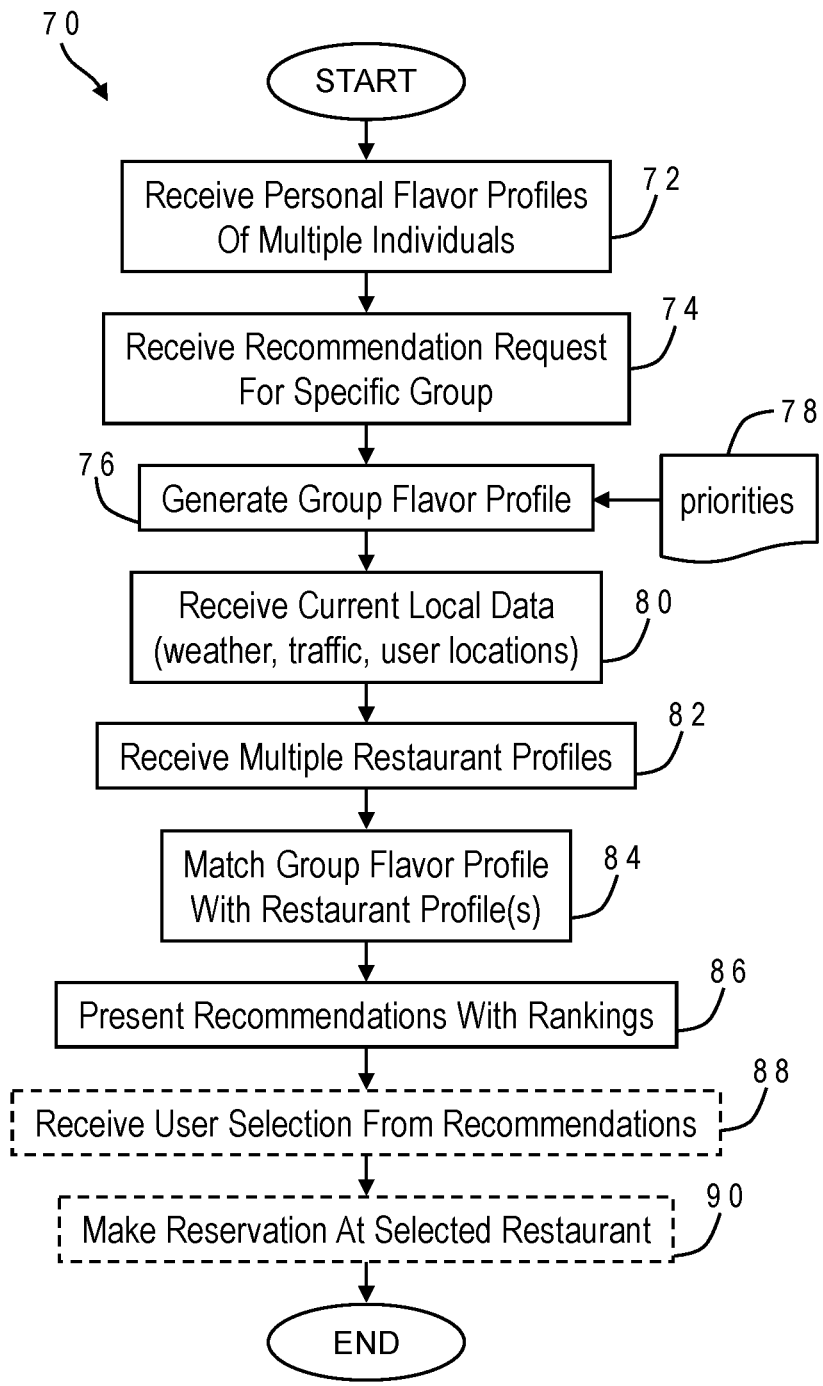
FIG. 7 is a chart illustrating the logical flow for a process to match a group flavor profile with a restaurant flavor profile in accordance with one implementation of the present invention.

The present invention in its various embodiments can be understood from two perspectives—the perspective of a group and the perspective of a restaurant. From the group's perspective, the present invention can create a flavor profile for the group that numerically describes the foods its members are interested in. This perspective is illustrated in FIGS. 2, 4 and 6. From the restaurant's perspective, the present invention can create a flavor profile for each business. This perspective is illustrated in FIG. 3. The invention then allows for matching of the group's profile with a particular restaurant's flavor profile, which is illustrated in FIGS. 5 and 7. While the invention is generally applicable to any group of individuals, it may be of particular interest to those who visit restaurants more frequently, such as a particular age group (e.g., 18-34), students, young professionals, socially active individuals, and business travelers.

Referring now to FIG. 2, there is depicted a representation of the creation of a personal flavor profile $P_i$ for an individual i in accordance with one implementation of the invention. Various inputs may be received (for example, by computer system 10 via one or more user interfaces) pertaining to taste/flavor preferences of the individual. The inputs may take the form of text descriptions for various kinds of foods the individual likes ("pasta"), or attributes of the individual that may bear on food preferences such as ethnicity, religion, nationality, cultural identity, etc. ("Hungarian"). Correlations between these descriptions/attributes and particular flavors may be manually entered into computer system 10 or deciphered using the neural network. Images of foods that the individual enjoys (in this example, a banana) can also be input. Computer system 10 may include a module that scans each person's social media for photos of food and the comments related to the food in order to attain labeled images.

The invention can employ deep learning systems such as a neural network which, given an image of a dish, drink, or ingredient, can determine the flavors it has. The neural network can be trained on a large dataset which maps images of foods with their flavors. For example, a dataset may include an image of a steak labeled with the flavor savory, or an image of a peach cobbler labeled with the flavor sweet (or fruit). In a preferred implementation, a convolutional neural network is trained on a dataset of food images mapped to multiple flavors, so that given a new image of a dish, the network can identify its primary flavor, and possibly one or more secondary flavors.

A convolution neural network is a specific type of feed-forward neural network based on animal visual perception, and so is particularly useful in processing image data. Convolutional neural networks are similar to ordinary neural networks but are made up of neurons that have learnable weights and biases. Each neuron receives some inputs, performs a dot product and optionally follows it with a non-linearity. The whole network can still express a single differentiable score function. The image data can be harvested from social media outlets, such as Instagram, Twitter, and Facebook, where users generally only take photos of meals they enjoyed. Employing this thought process, images presented by a user would increase the likelihood that the user enjoyed the meal. Furthermore, images of groups of individuals enjoying a meal at a particular restaurant increases the likelihood that the group as a whole enjoyed the meal. Other kinds of neural networks can be employed, such as other feed-forward neural networks adapted to text input. A convolutional neural network can also be combined with a recurrent neural network. A deep-learning recurrent neural network known as a long short-term memory network combined with a convolutional neural network is known to improve automatic image captioning.

The taste inputs may also include one or more dining venues which the individual already enjoys ("Jake's Barbecue"). The neural network can analyze any web presence of that venue to similarly determine predominant flavors, i.e., using known search strategies to identify the venue online and take into consideration text descriptions of its menu as well as food images. Alternatively, or in addition, the invention can incorporate portions of any restaurant profile already available for that establishment as a contribution to the individual's personal flavor profile.

A wide variety of other factors can be used to infer taste preferences. "Likes" (a user input to a social media platform) or followers of a venue on social media imply greater user preferences. Reviews on various web sites (e.g., Yelp, OpenTable) can indicate approval or disapproval (a natural language classifier such as the IBM Watson Natural Language Classifier service can be used for this purpose). Historical purchases of a user from restaurants may be tracked through credit or debit card usage, as well as frequency of meal purchases. GPS data from a user's mobile device (and devices of other members of group) can suggest preferred restaurants based on distances. Restaurant preferences (and hence food preferences) may also be inferred from wait time and popularity of restaurants, happy hours or specials, loyalty programs, etc., as well as combinations of any of the foregoing.

After the initial creation, an individual's flavor profile can be updated in various ways, such as providing additional inputs, or feedback from dining experiences. For example, if a person likes a particular menu item or restaurant, she can enter that information into computer system 10 which then revises the personal flavor profile.

The present invention contemplates a wide range of flavor types which may be considered when constructing flavor profiles (personal or restaurant). An exemplary implementation includes at least the five universally recognized tastes of sweet, sour, bitter, salty, and savory (umami). Other flavors may be included such as spicy hot (capsaicin), as well as specific ingredients such as particular spices, e.g., cinnamon or turmeric. Different food types (meats, breads, desserts, etc.) can be mapped to particular flavors. Flavors are not necessarily mutually exclusive, i.e., a dish could be both savory and sweet. Any combination of flavors is possible.

Personal profiles can also include various food restrictions. For example, and without limitation, these restrictions may be medical in nature (food allergies such as nuts, or intolerances such as gluten), religious (Kosher or Halal), or lifestyle choices (non-dairy, vegetarian/vegan). The restrictions can be applied by excluding any restaurant from a recommendation if that restaurant does not provide at least one menu option comporting with the restriction.

Dietary restrictions can be applied in a manner other than to simply exclude a particular restaurant. They can be used in the weighting of restaurants (both high and low); for example, restaurants with many gluten-free options versus few or no gluten-free options. Dietary restrictions can also be used to find subgroups; for example, if there is a group composed of three vegetarians and three barbecue (meat) lovers, the group could be split into two groups with similar tastes.

A personal profile can optionally take into consideration other factors besides foods or flavors such as a person's price range for a meal, or how important service and ambience is (fancy, business casual, etc.). Other factors might include the distance they are willing to travel to get to a restaurant, or the traffic they are willing to endure (GPS information and temporal data from a user's mobile computing device can assist in these considerations). These and other factors can either be entered manually or inferred from the user's patterns and information from Internet sources.

Different policies can be used to combine the taste preference inputs of an individual to arrive at numerical values for taste preferences in the personal profile, including a value of zero. In a basic implementation, a single (primary) flavor type is associated with each input, and these types are summed to provide preference percentages. For example, a user of computer system 10 has entered twenty-one different items associated with savory, seventeen items associated with sour, nine items associated with salty, three items associated with sweet, and no items associated with bitter (for a total of fifty entries). The personal flavor profile would then reflect 42% savory, 34% sour, 18% salty, 6% sweet, and 0% bitter. More complex embodiments can take into consideration secondary (or tertiary, etc.) flavors of a single item, possibly giving lesser weights to those flavors. The present invention also contemplates the creation of multiple personal flavor profiles for a single individual using different policies.

FIG. 3 shows a similar representation for the creation of a restaurant profile $R_j$ for a given restaurant or dining venue j in accordance with one implementation of the invention. The term "restaurant" as used herein is not intended to be limited to any particular style of venue, and can include cafés, diners, bistros, lunchrooms, cafeterias, canteens, inns or hotels, or even locales such as saloons, bars or coffee shops which primarily offer drinks but may also have a small selection of foods or snacks. Various inputs are received by computer system 10 via one or more user interfaces pertaining to tastes/flavors available at the restaurant. The inputs may be derived from various menu entries including appetizers, drinks, entrées, and desserts. Entries may be made via text fields or via images from the menu, which can again be interpreted by the neural network running on computer system 10. After determining the flavor of each item, a flavor profile of the restaurant is created. As with the personal profiles, different policies can be used to arrive at numerical values representing the different flavors on hand, such as percentages based on the number of primary flavor types of the different available menu items. Restriction-friendly items can also be noted, either manually or using the deep-learning system. A restaurant profile could be constructed by means other than averaging individual menu selections, such as based on count, i.e., the number of vegetarian options, number of craft beers on tap, etc., or using weightings of different dishes to determine weighted averages of menu categories. For example, if a restaurant has high ratings for pastas, but low ratings for steaks, the restaurant would be recommended for a group of people wanting pasta.

After the initial creation, a restaurant's flavor profile can be updated in various ways, such as providing additional inputs or observing changes in the menu, which may occur as a result of feedback from diners, for example, on Yelp or another web-based review site. A restaurant can also examine a reviewer's individual flavor profile and the flavor profiles of groups she is a part of to revise their menus and cater to more people, and have a more precise understanding of their customers.

With further reference to FIG. 4, computer system 10 can combine multiple personal flavor profiles to generate group profiles for different groups of the individuals. In this example, there are at least four different profiles $P_1$, $P_2$, $P_3$, $P_4$ corresponding to individuals Susan, Jason, Marie and Bobby. The profiles can be collected from distributed locations, or co-located in a profiles database 50 within computer system 10. When a group of these individuals decides to go out for a meal, group combination logic 52 running in computer system 10 uses the personal flavor profiles corresponding to the selected individuals to create the group profiles. In this example, a first group profile $G_1$ is created for a first group consisting of Susan, Jason and Marie ($\{P_1, P_2, P_3\}$), a second group profile $G_2$ is created for a second group consisting of Susan, Jason and Bobby ($\{P_1, P_2, P_4\}$), and a third group profile $G_1$ is created for a third group consisting of Jason, Marie and Bobby ($\{P_2, P_3, P_4\}$).

Different algorithms may be used to construct a group flavor profile from the multiple personal flavor profiles. In one implementation as seen in FIG. 5, the group flavor profile can represent an average of the constituent elements of the personal flavor profiles. In this example, a first individual has a personal flavor profile $P_1$ that consists of 40% savory, 10% salty, 20% sweet, 10% bitter, and 20% sour, while a second individual has a personal flavor profile $P_2$ that consists of 20% savory, 30% salty, 40% sweet, 0% bitter, and 10% sour. The first individual has entered no dietary restrictions but the second individual has indicated a vegetarian status. The group combination logic can average the respective pairs of flavor types to result in a group profile $G_1$ consisting of 30% savory, 20% salty, 30% sweet, 5% bitter, and 15% sour, with a vegetarian restriction. This group profile $G_1$ is then compared to various restaurant profiles on file within computer system 10, five of which $R_1$, $R_2$, $R_3$, $R_4$, $R_5$ are shown; the restaurant profiles may also be stored in profiles database 50. In this implementation, two of these profiles, $R_1$ and $R_2$, are immediately excluded because they are indicated as not providing any vegetarian options, even though the restaurant corresponding to profile $R_2$ would otherwise be a perfect match. Of the three remaining profiles, the closest (but not perfect) match is $R_4$, which is returned by computer system 10 to the users as the recommended dining venue. Those skilled in the art will appreciate that this example is simplified by showing only two personal profiles for ease of illustration but there is no limit to the number of individuals that can comprise a group, and similarly there may be a very large number of restaurant profiles to choose from.

The mathematical formula for determining the closest profile match can vary according to different embodiments. In the illustrative implementation each restaurant profile undergoes a least-squares analysis to quantitatively determine its deviation from the submitted group profile. Any or all of the factors (food and non-food) can be subject to an algorithm that prioritizes which aspects of the profile are most important to the user and gives extra weight to those priorities in a quantitative manner to obtain the optimum match. Strong preferences can take precedence over moderate or slight preferences. Multiple venue suggestions can be provided with respective rankings or confidence values based on the numerical deviations for each restaurant profile. For example, a perfect match might be assigned a rank or score of 100%, with lesser matches decreasing in rank value. As further noted above, the rankings can additionally include other quantitative deviations, e.g., from a desired price range, travel time, or geographical distances from users to a locale. Of course, a single individual's flavor profile can be used standalone to pick a restaurant just for him/her.

Other techniques may be used in combination with the foregoing to find the best match. The nature of the particular group may be enlightening. Professionals seeking a work lunch may prioritize proximity over cost, while students might be willing to travel farther for a less expensive meal. The invention also contemplates the possible use of vectors for categorical restaurant ratings. For example, a restaurant might have a vector rating R=<Gluten-Free Friendliness: 0.61; Vegetarian Friendly: 0.46; Business Atmosphere: 0.60; Casual Atmosphere: 0.80; Spicy Food: 0.31, . . . >. This vector can be compared with vectors of user profiles, such as $U_1$=<Gluten-Free Diet: 1.00; Vegetarian Diet: 0.95; Business: 0.0; Casual: 1.0; Spicy Food: 0.87, . . . >. Multiple scores can then be computed, i.e.:

Gluten Score: R[0] *(U1[0]+U2[0]+U3[0]+ . . . )
Vegetarian Score: R[1] *(U1[1]+U2[1]+U3[1]+ . . . )
Business Environment Score: R[2] *(U1[2]+U2[2]+U3[2]+ . . . )
Casual Environment Score: R[3] *(U1[3]+U2[3]+U3[3]+ . . . )
Spicy Food Score: R[3] *(U1[3]+U2[3]+U3[3]+ . . . ).

Additionally, one could use these vectors as training data for a neural network that matches user profile vectors (input) to restaurants (labels) given historical preferences.

Here is an example of the invention at work. Suppose that the most important aspects of Ivan's flavor profile in order of importance are that he loves Mexican cuisine, he doesn't want to drive more than five miles for it, and the price range is a maximum of $12.00 for a meal (entrée). Suppose the most important aspects of Justin's profile are that he is vegetarian, and he does not care how much he has to pay as long as the food is tasty. A group profile would be created that highly prioritizes restaurants having vegetarian items, then prioritizes Mexican food and distance, and then finally prioritizes the affordability of the restaurant. Using this group profile it is possible that the two, Ivan and Justin, may be favorably matched to a Mexican restaurant that is close to Ivan's house and has medium-high price range. If either Ivan or Justin dislike the choice, they can input their feedback to the application, and it learns and updates the priorities and/or their individual profiles.

The present invention can be further understood with reference to the chart of FIG. 6 which illustrates the logical flow for an individual flavor profile generation process 60 in accordance with one implementation. Process 60 begins with computer system 10 receiving personal food preferences (as well as non-food preferences in some embodiments) of the individual (62). The food preferences may be entered by way of text, photos or other images, identification of known venues or restaurant types, and demographic attributes of the individual. The food preferences are then mapped to particular flavor types (64). The mapping may provide for only a primary flavor type for each input, or multiple flavor types with varying weights. The mapping can be performed manually, or based on a list or table that relate particular dishes or cuisines to specific flavor types, or using a deep learning system such as a convolutional neural network. All of the flavor types indicated from the inputs are then combined to create the individual flavor profile as a quantitative measure (66). This step may for example be based on percentages derived from the numbers of different flavor types indicated. The individual flavor profile can thereafter be adjusted based on updated inputs by the user or from feedback via other means such as online review systems or via prompts (68), such as "on a scale of 1-5, how much do you prefer bitter foods?"

The present invention can also be understood with reference to the chart of FIG. 7 which illustrates the logical flow for a restaurant recommendation process 70 in accordance with one implementation. Process 70 begins with computer system 10 receiving the personal flavor profiles for multiple individuals (72). These personal flavor profiles may be generated pursuant to the process 60 of FIG. 6, and may be previously stored such as in the profiles database 50. Computer system 10 then receives a request from a user to recommend a dining venue for a particular group of the individuals (74). The user does not necessarily have to be one of the individuals; for example, a secretary or assistant to one of the individuals could make the request. The request identifies which individuals comprise the group. A group flavor profile is then created based on the selected individuals comprising the group (76). This step can be performed using one or more priorities for the different profile elements (78). In this implementation, the request/profiles may include non-food components, in which case current local data may be obtained such as weather outlook, traffic conditions, and locations of the individuals making up the particular group in question (80). Computer system further receives multiple restaurant profiles which are to be analyzed for the recommendation (82). These restaurant profiles may also be previously stored such as in the profiles database 50. Computer system 10 can then find one or more matches of the group flavor profile to restaurant profiles (84). Match results are presented to the requestor with appropriate rankings (86). The user may optionally select one of the recommended restaurants that appears suitable (88), in which case computer system 10 can proceed to electronically make a reservation at the selected restaurant through any appropriate means such as an Internet interface, for example, the Nowait reservation application (90). The reservation can be made for the number of people indicated by the group and at a time which allows a sufficient period for travel of the members of the group or as otherwise indicated by the user.

In this manner, not only does the present invention help groups find suitable places to eat, but it can also help restaurants understand their customers, and adapt their menu to meet their customers' preferences. Many inventions in the area of food recommendation give suggestions for a single user such as particular foods, portions, or even nutrients, but they fail to provide recommendations for a group. The present invention advances this technical field by allowing a recommendation for a group having seemingly disparate tastes. Using an application that implements this invention, they are able to find a restaurant that satisfies each and every member.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method for choosing a dining venue for a group of people comprising:
    receiving a plurality of individual flavor profiles wherein each individual flavor profile contains information pertaining to flavor preferences of a respective individual, and each individual flavor profile includes respective numerical values associated with at least five different flavor types of savory, salty, sweet, bitter and sour, by executing first instructions in a computer system, wherein at least one of the individual flavor profiles is created by receiving an input for one of the individuals indicative of a flavor type and determining the flavor type using a deep-learning neural network;
    receiving a plurality of venue flavor profiles wherein each venue flavor profile contains information pertaining to available items including multiple menu entries at a respective dining venue, and each venue flavor profile includes respective numerical values associated with the at least five different flavor types, by executing second instructions in the computer system;
    receiving a request to choose a dining venue for a group consisting of a plurality of the individuals, by executing third instructions in the computer system;
    creating a group flavor profile based on a subset of the individual flavor profiles corresponding to the plurality of individuals, by executing fourth instructions in the computer system, wherein the group flavor profile includes respective numerical values associated with the at least five different flavor types which are a function of respective numerical values from the subset of the individual flavor profiles; and
    selecting a dining venue based on the group flavor profiles and the venue flavor profiles, by executing fifth instructions in the computer system, wherein said selecting includes performing a least-squares analysis to quantitatively determine a deviation of the numerical values for a given one of the venue flavor profiles compared to respective numerical values for the group flavor profile.

2. The method of claim 1 wherein said creating includes averaging numerical values for respective flavor types from each of the individual flavor profiles of the subset.

3. The method of claim 1 wherein at least one of the individual flavor profiles includes at least one non-food preference selected from a group consisting of cost, traffic, distance and weather.

4. The method of claim 3 further comprising receiving current local data pertaining to the at least one non-food preference.

5. The method of claim 1 further comprising making an electronic reservation at the selected dining venue.

6. A computer system comprising:
    one or more processors which process program instructions;
    a memory device connected to said one or more processors; and
    program instructions residing in said memory device for choosing a dining venue for a group of people by receiving a plurality of individual flavor profiles wherein each individual flavor profile contains information pertaining to flavor preferences of a respective individual, each individual flavor profile includes respective numerical values associated with at least five different flavor types of savory, salty, sweet, bitter and sour, and at least one of the individual flavor profiles is created by receiving an input for one of the individuals indicative of a flavor type and determining the flavor type using a deep-learning neural network, receiving a plurality of venue flavor profiles wherein each venue flavor profile contains information pertaining to available items including multiple menu entries at a respective dining venue and each venue flavor profile includes respective numerical values associated with the at least five different flavor types, receiving a request to choose a dining venue for a group consisting of a plurality of the individuals, creating a group flavor profile based on a subset of the individual flavor profiles corresponding to the plurality of individuals wherein the group flavor profile includes respective numerical values associated with the at least five different flavor types which are a function of respective numerical values from the subset of the individual flavor profiles, and selecting a dining venue based on the group flavor profiles and the venue flavor profiles by performing a least-squares analysis to quantitatively determine a deviation of the numerical values for a given one of the venue flavor profiles compared to respective numerical values for the group flavor profile.

7. The computer system of claim 6 wherein the creating includes averaging numerical values for respective flavor types from each of the individual flavor profiles of the subset.

8. The computer system of claim 6 wherein at least one of the individual flavor profiles includes at least one non-food preference selected from a group consisting of cost, traffic, distance and weather.

9. The computer system of claim 8 wherein said program instructions further receive current local data pertaining to the at least one non-food preference.

10. The computer system of claim 6 wherein said program instructions further make an electronic reservation at the selected dining venue.

11. A computer program product comprising:
   a computer readable storage medium; and
   program instructions residing in said storage medium for choosing a dining venue for a group of people by receiving a plurality of individual flavor profiles wherein each individual flavor profile contains information pertaining to flavor preferences of a respective individual, each individual flavor profile includes respective numerical values associated with at least five different flavor types of savory, salty, sweet, bitter and sour, and at least one of the individual flavor profiles is created by receiving an input for one of the individuals indicative of a flavor type and determining the flavor type using a deep-learning neural network, receiving a plurality of venue flavor profiles wherein each venue flavor profile contains information pertaining to available items including multiple menu entries at a respective dining venue and each venue flavor profile includes respective numerical values associated with the at least five different flavor types, receiving a request to choose a dining venue for a group consisting of a plurality of the individuals, creating a group flavor profile based on a subset of the individual flavor profiles corresponding to the plurality of individuals wherein the group flavor profile includes respective numerical values associated with the at least five different flavor types which are a function of respective numerical values from the subset of the individual flavor profiles, and selecting a dining venue based on the group flavor profiles and the venue flavor profiles by performing a least-squares analysis to quantitatively determine a deviation of the numerical values for a given one of the venue flavor profiles compared to respective numerical values for the group flavor profile.

12. The computer program product of claim 11 wherein the creating includes averaging numerical values for respective flavor types from each of the individual flavor profiles of the subset.

13. The computer program product of claim 11 wherein at least one of the individual flavor profiles includes at least one non-food preference selected from a group consisting of cost, traffic, distance and weather.

14. The computer program product of claim 13 wherein said program instructions further receive current local data pertaining to the at least one non-food preference.

\* \* \* \* \*